(12) United States Patent
Hammad et al.

(10) Patent No.: US 8,346,639 B2
(45) Date of Patent: Jan. 1, 2013

(54) AUTHENTICATION OF A DATA CARD USING A TRANSIT VERIFICATION VALUE

(75) Inventors: Ayman Hammad, Pleasanton, CA (US); Philip B. Dixon, San Diego, CA (US)

(73) Assignee: Visa U.S.A. Inc., San Francisco, CA (US)

( * ) Notice: Subject to any disclaimer, the term of this patent is extended or adjusted under 35 U.S.C. 154(b) by 441 days.

(21) Appl. No.: 11/680,594

(22) Filed: Feb. 28, 2007

(65) Prior Publication Data

US 2008/0203152 A1 Aug. 28, 2008

(51) Int. Cl.
*G06Q 40/00* (2012.01)
(52) U.S. Cl. ............... 705/35; 705/14; 705/21; 705/22; 705/26; 705/38; 705/39; 705/41; 705/44; 705/50; 705/74; 705/75; 701/117; 709/203; 709/205; 709/224; 235/380; 235/381; 235/382; 235/383; 235/435; 235/492; 340/10.41; 340/572.7; 340/426.35; 380/270; 379/91.02; 348/150; 455/406; 194/205; 725/78; 707/999.03
(58) Field of Classification Search .............. 705/14, 705/21, 22, 26, 35, 38, 39, 41, 44, 50, 74, 705/75; 701/117; 709/203, 205, 224; 235/380, 235/381, 382, 383, 435, 492; 340/10.41, 340/572.7, 426.35; 380/270; 379/91.02; 348/150; 455/406; 194/205; 725/78; 707/999.03
See application file for complete search history.

(56) References Cited

U.S. PATENT DOCUMENTS

| | | | |
|---|---|---|---|
| 2,328,654 A | 9/1943 | Lake et al. |
| 3,008,635 A | 11/1961 | Sakalay |
| 4,303,904 A | 12/1981 | Chasek |
| 4,672,182 A | 6/1987 | Hirokawa |
| 4,736,094 A | 4/1988 | Yoshida |
| 4,822,985 A | 4/1989 | Boggan et al. |
| 4,851,650 A | 7/1989 | Kitade |
| 4,857,893 A | 8/1989 | Carroll |
| 4,870,259 A | 9/1989 | Boggan et al. |

(Continued)

FOREIGN PATENT DOCUMENTS

CN 1436431 A 8/2008

(Continued)

OTHER PUBLICATIONS

"Understanding the Requirements of ISO/IEC 14443 for Type B Proximity Contactless Identification Cards" by ATMEL, revised in Nov. 2005.*

(Continued)

*Primary Examiner* — James Trammell
*Assistant Examiner* — Sanjeev Malhotra
(74) *Attorney, Agent, or Firm* — Kilpatrick Townsend & Stockton LLP (57) ABSTRACT

Transaction processing involves receiving data from an access transaction application of a portable consumer device, wherein the received data comprises data from an access transaction data string that includes a transit verification value wherein, with the exception of the transit verification value, the access transaction data string is substantially similar to a retail data string comprising retail data, wherein the access application data string is adapted for use with an access transaction processing system and the retail data string is adapted for use with a retail processing system. The transaction processing involves processing access transaction application data for selective authorization of the transaction.

17 Claims, 6 Drawing Sheets

U.S. PATENT DOCUMENTS

| | | | |
|---|---|---|---|
| 4,899,036 A | 2/1990 | McCrindle et al. | |
| 4,908,521 A | 3/1990 | Boggan et al. | |
| 4,928,001 A | 5/1990 | Masada | |
| 4,943,707 A | 7/1990 | Boggan | |
| 5,103,079 A | 4/1992 | Barakai et al. | |
| 5,191,193 A | 3/1993 | Le Roux | |
| 5,286,955 A | 2/1994 | Klosa | |
| 5,337,063 A | 8/1994 | Takahira | |
| 5,360,967 A | 11/1994 | Perkin et al. | |
| 5,396,558 A | 3/1995 | Ishiguro et al. | |
| 5,477,038 A | 12/1995 | Levine et al. | |
| 5,485,520 A * | 1/1996 | Chaum et al. | 705/74 |
| 5,500,513 A | 3/1996 | Langhans et al. | |
| 5,503,774 A | 4/1996 | Brons et al. | |
| 5,550,734 A | 8/1996 | Tarter et al. | |
| 5,562,550 A | 10/1996 | Chartrand | |
| 5,585,614 A | 12/1996 | VonBallmoos | |
| 5,585,787 A | 12/1996 | Wallerstein | |
| 5,649,118 A | 7/1997 | Carlisle et al. | |
| 5,801,943 A * | 9/1998 | Nasburg | 701/117 |
| 5,828,044 A | 10/1998 | Jun et al. | |
| 5,844,230 A | 12/1998 | Lelonde | |
| 5,864,830 A | 1/1999 | Armetta et al. | |
| 5,883,377 A | 3/1999 | Chapin, Jr. | |
| 5,903,830 A | 5/1999 | Joao et al. | |
| 5,917,965 A | 6/1999 | Cahill et al. | |
| 5,929,428 A * | 7/1999 | Iijima | 235/492 |
| 5,946,669 A | 8/1999 | Polk | |
| 5,953,710 A | 9/1999 | Fleming | |
| 5,984,180 A | 11/1999 | Albrecht | |
| 5,984,191 A | 11/1999 | Chapin, Jr. | |
| 5,991,527 A | 11/1999 | Plint et al. | |
| 5,991,749 A * | 11/1999 | Morrill, Jr. | 705/44 |
| 6,021,943 A | 2/2000 | Chastain | |
| 6,038,597 A | 3/2000 | Van Wyngarden | |
| 6,039,245 A | 3/2000 | Symonds et al. | |
| 6,044,360 A | 3/2000 | Picciallo | |
| 6,097,292 A * | 8/2000 | Kelly et al. | 340/572.7 |
| 6,101,477 A | 8/2000 | Hohle et al. | |
| 6,105,009 A | 8/2000 | Cuervo | |
| 6,119,107 A | 9/2000 | Polk | |
| 6,138,917 A | 10/2000 | Chapin, Jr. | |
| 6,176,425 B1 | 1/2001 | Harrison et al. | |
| 6,179,205 B1 | 1/2001 | Sloan | |
| 6,185,307 B1 * | 2/2001 | Johnson, Jr. | 380/270 |
| 6,199,762 B1 | 3/2001 | Hohle | |
| 6,216,227 B1 | 4/2001 | Goldstein et al. | |
| 6,402,029 B1 | 6/2002 | Gangi | |
| 6,422,462 B1 | 7/2002 | Cohen | |
| 6,453,335 B1 | 9/2002 | Kaufmann | |
| 6,473,500 B1 | 10/2002 | Risafi et al. | |
| 6,502,745 B1 | 1/2003 | Stimson et al. | |
| 6,529,725 B1 | 3/2003 | Joao et al. | |
| 6,549,912 B1 | 4/2003 | Chen | |
| 6,577,229 B1 * | 6/2003 | Bonneau et al. | 340/10.41 |
| 6,587,835 B1 | 7/2003 | Treyz et al. | |
| 6,609,655 B1 * | 8/2003 | Harrell | 235/380 |
| 6,615,189 B1 | 9/2003 | Phillips et al. | |
| 6,615,190 B1 | 9/2003 | Slater | |
| 6,629,591 B1 * | 10/2003 | Griswold et al. | 194/205 |
| 6,655,587 B2 * | 12/2003 | Andrews et al. | 235/383 |
| 6,685,088 B1 | 2/2004 | Royer et al. | |
| 6,726,098 B2 | 4/2004 | Schilling | |
| 6,729,549 B2 * | 5/2004 | Hamann et al. | 235/492 |
| 6,732,080 B1 | 5/2004 | Blants | |
| 6,859,650 B1 | 2/2005 | Ritter | |
| 6,892,187 B2 | 5/2005 | Phillips et al. | |
| 6,915,277 B1 | 7/2005 | Manchester et al. | |
| 6,934,689 B1 | 8/2005 | Ritter et al. | |
| 6,938,821 B2 | 9/2005 | Gangi | |
| 6,970,891 B1 | 11/2005 | Deo et al. | |
| 7,054,838 B2 | 5/2006 | Sutton et al. | |
| 7,083,087 B1 | 8/2006 | Gangi | |
| 7,092,697 B1 * | 8/2006 | Kupsh et al. | 455/406 |
| 7,096,003 B2 | 8/2006 | Joao et al. | |
| 7,114,179 B1 | 9/2006 | Ritter et al. | |
| 7,130,828 B2 | 10/2006 | Phillips et al. | |
| 7,163,145 B2 | 1/2007 | Cohagan et al. | |
| 7,165,049 B2 | 1/2007 | Slater | |
| 7,171,388 B2 | 1/2007 | Phillips et al. | |
| 7,172,112 B2 | 2/2007 | Bonalle et al. | |
| 7,174,314 B2 | 2/2007 | Phillips et al. | |
| 7,174,315 B2 | 2/2007 | Phillips et al. | |
| 7,174,316 B2 | 2/2007 | Phillips et al. | |
| 7,174,317 B2 | 2/2007 | Phillips et al. | |
| 7,209,757 B2 | 4/2007 | Naghian et al. | |
| 7,225,155 B1 | 5/2007 | Polk | |
| 7,268,667 B2 | 9/2007 | Beenau et al. | |
| 7,268,668 B2 | 9/2007 | Beenau et al. | |
| 7,317,823 B1 | 1/2008 | Price et al. | |
| 7,360,699 B2 | 4/2008 | Cohagan et al. | |
| 7,363,273 B2 | 4/2008 | Phillips et al. | |
| 7,433,452 B2 | 10/2008 | Taylor et al. | |
| 7,437,362 B1 * | 10/2008 | Ben-Natan | 707/999.003 |
| 7,447,662 B2 | 11/2008 | Gibson | |
| 7,469,827 B2 | 12/2008 | Katragadda et al. | |
| 7,506,804 B2 | 3/2009 | Zajkowski et al. | |
| 7,527,208 B2 | 5/2009 | Hammad et al. | |
| 7,529,563 B1 | 5/2009 | Pitroda | |
| 7,594,611 B1 | 9/2009 | Arrington, III | |
| 7,959,074 B1 * | 6/2011 | Chopra et al. | 235/380 |
| 8,118,223 B2 | 2/2012 | Hammad et al. | |
| 2001/0026679 A1 | 10/2001 | Koshino et al. | |
| 2001/0033447 A1 | 10/2001 | Miles | |
| 2001/0051920 A1 * | 12/2001 | Joao et al. | 705/41 |
| 2001/0056536 A1 | 12/2001 | Everett et al. | |
| 2002/0002534 A1 | 1/2002 | Davis et al. | |
| 2002/0010603 A1 | 1/2002 | Doi et al. | |
| 2002/0038336 A1 * | 3/2002 | Abileah et al. | 709/203 |
| 2002/0050528 A1 | 5/2002 | Everett et al. | |
| 2002/0077122 A1 | 6/2002 | Yule | |
| 2002/0103865 A1 * | 8/2002 | Lilly | 709/205 |
| 2002/0111919 A1 | 8/2002 | Weller et al. | |
| 2002/0118118 A1 | 8/2002 | Myllymaki et al. | |
| 2002/0145984 A1 | 10/2002 | Babu et al. | |
| 2002/0152123 A1 * | 10/2002 | Giordano et al. | 705/14 |
| 2002/0152163 A1 | 10/2002 | Bezos et al. | |
| 2002/0156807 A1 | 10/2002 | Dieberger | |
| 2002/0163884 A1 | 11/2002 | Peles et al. | |
| 2002/0194138 A1 | 12/2002 | Dominguez et al. | |
| 2003/0028814 A1 | 2/2003 | Carta et al. | |
| 2003/0050087 A1 | 3/2003 | Kwon | |
| 2003/0050906 A1 | 3/2003 | Clifton-Bligh | |
| 2003/0053609 A1 | 3/2003 | Risafi et al. | |
| 2003/0061111 A1 * | 3/2003 | Dutta et al. | 705/26 |
| 2003/0083944 A1 * | 5/2003 | Duvall et al. | 705/21 |
| 2003/0105711 A1 | 6/2003 | O'Neil | |
| 2003/0135487 A1 | 7/2003 | Beyer et al. | |
| 2003/0137435 A1 | 7/2003 | Haddad et al. | |
| 2003/0144894 A1 | 7/2003 | Robertson et al. | |
| 2003/0174839 A1 | 9/2003 | Yamagata et al. | |
| 2003/0181845 A1 | 9/2003 | Orton | |
| 2003/0216927 A1 | 11/2003 | Sridhar et al. | |
| 2003/0221195 A1 * | 11/2003 | Bizet | 725/78 |
| 2004/0000585 A1 | 1/2004 | Silverbrook et al. | |
| 2004/0006536 A1 | 1/2004 | Kawashima et al. | |
| 2004/0016801 A1 | 1/2004 | Newsome et al. | |
| 2004/0039686 A1 * | 2/2004 | Klebanoff | 705/38 |
| 2004/0117300 A1 | 6/2004 | Jones et al. | |
| 2004/0139024 A1 | 7/2004 | Reed | |
| 2004/0155960 A1 * | 8/2004 | Wren et al. | 348/150 |
| 2004/0256455 A1 | 12/2004 | Fukushima et al. | |
| 2005/0018574 A1 | 1/2005 | Jenkins et al. | |
| 2005/0036391 A1 | 2/2005 | Tomiie et al. | |
| 2005/0053211 A1 | 3/2005 | Bevente et al. | |
| 2005/0086160 A1 * | 4/2005 | Wong et al. | 705/39 |
| 2005/0103839 A1 * | 5/2005 | Hewel | 235/380 |
| 2005/0127168 A1 | 6/2005 | Phillips et al. | |
| 2005/0165695 A1 | 7/2005 | Berardi et al. | |
| 2005/0173518 A1 | 8/2005 | Takayama | |
| 2005/0185774 A1 * | 8/2005 | Grear et al. | 379/91.02 |
| 2005/0203842 A1 | 9/2005 | Sanchez et al. | |
| 2005/0234778 A1 * | 10/2005 | Sperduti et al. | 705/22 |
| 2005/0240743 A1 | 10/2005 | Eng et al. | |
| 2005/0269417 A1 | 12/2005 | Wood | |
| 2006/0100933 A1 | 5/2006 | Fujita et al. | |
| 2006/0106650 A1 | 5/2006 | Bush | |

| | | | |
|---|---|---|---|
| 2006/0161435 A1 | 7/2006 | Atef et al. | |
| 2006/0240862 A1 | 10/2006 | Neven et al. | |
| 2006/0258337 A1 | 11/2006 | Fujita et al. | |
| 2006/0278704 A1* | 12/2006 | Saunders et al. | 235/382 |
| 2006/0282528 A1* | 12/2006 | Madams et al. | 709/224 |
| 2006/0287964 A1 | 12/2006 | Brown | |
| 2007/0023504 A1 | 2/2007 | Blankenship et al. | |
| 2007/0045403 A1 | 3/2007 | Slonecker, Jr. | |
| 2007/0051797 A1* | 3/2007 | Randolph-Wall et al. | 235/381 |
| 2007/0075140 A1* | 4/2007 | Guez et al. | 235/435 |
| 2007/0076872 A1 | 4/2007 | Juneau | |
| 2007/0087818 A1 | 4/2007 | Walker et al. | |
| 2007/0100664 A1 | 5/2007 | Seib et al. | |
| 2007/0100691 A1 | 5/2007 | Patterson | |
| 2007/0100754 A1* | 5/2007 | Brown | 705/50 |
| 2007/0103277 A1* | 5/2007 | Yuk et al. | 340/426.35 |
| 2007/0145135 A1 | 6/2007 | Jogand-Coulomb et al. | |
| 2007/0168674 A1 | 7/2007 | Nonaka et al. | |
| 2008/0033880 A1* | 2/2008 | Fiebiger et al. | 705/44 |
| 2008/0054072 A1 | 3/2008 | Katragadda et al. | |
| 2008/0116264 A1 | 5/2008 | Hammad et al. | |
| 2008/0120214 A1* | 5/2008 | Steele et al. | 705/35 |
| 2008/0128513 A1 | 6/2008 | Hammad et al. | |
| 2008/0156873 A1 | 7/2008 | Wilhelm et al. | |
| 2008/0162295 A1 | 7/2008 | Bedier | |
| 2008/0172341 A1* | 7/2008 | Crandell | 705/75 |
| 2008/0201212 A1 | 8/2008 | Hammad et al. | |
| 2008/0203151 A1 | 8/2008 | Dixon et al. | |
| 2008/0203170 A1 | 8/2008 | Hammad et al. | |
| 2008/0208681 A1 | 8/2008 | Hammad et al. | |
| 2008/0230600 A1 | 9/2008 | Black et al. | |
| 2009/0171682 A1 | 7/2009 | Dixon et al. | |
| 2009/0184163 A1 | 7/2009 | Hammad et al. | |
| 2009/0239512 A1 | 9/2009 | Hammad et al. | |

FOREIGN PATENT DOCUMENTS

| | | |
|---|---|---|
| EP | 0 254 595 B1 | 1/1988 |
| EP | 0 795 165 B1 | 9/2000 |
| GB | 2 267 626 A | 12/1993 |
| KR | 100287012 B1 | 1/2001 |
| WO | WO 01/91485 A1 | 11/2001 |
| WO | 02/093307 A2 | 11/2002 |
| WO | 02/093307 A3 | 11/2002 |
| WO | 2004/079611 A1 | 9/2004 |
| WO | 2005/121975 A1 | 12/2005 |
| WO | WO2006/124808 A1 | 11/2006 |
| WO | WO 2007/139302 A1 | 12/2007 |

OTHER PUBLICATIONS

"The NYC Subway Trial | MasterCard® | About the Trial", downloaded from the Internet at http://www.mastercard.com/us/paypass/subway/about/subwaytrial_newsrelease_30Jan2006html on Jun. 11, 2008, pp. 1-2.

"Metrorail, Washington, D.C.", wwww.wikipedia.org, printed Jul. 31, 2008.

Notice from the European Patent Office dated Oct. 1, 2007 concerning business methods, Official Journal EPO, Nov. 2007, p. 592-593.

Supplementary European Search Report dated Jan. 5, 2011 for European Application No. 08743584, 5 pages.

"SmartTrip," version edited by Schumin Web on Sep. 4, 2005, downloaded from the internet at http://www.wikipedia.org, on Feb. 24, 2011, 4 pages.

American Public Transportation Association; "Account Linked Payment Service Concept White Paper", downloaded from the internet at http://www.speacq.com/industry/APTA_FSP_ALPS_White_Paper.pdf ; (last modified Jan. 25, 2007), 33 pages.

AMTEL; "Understanding the Requirements of ISO/IEC 14443 for Type B Proximity Contactless Identification Cards"; Nov. 2005; 28 pages.

Australian Office Action mailed on Oct. 4, 2011, for AU Patent Application No. 2008221392, 2 pages.

Australian Notice of Acceptance mailed on Jan. 15, 2012, for AU Patent Application No. 2008221392, 1 page.

Chinese Office Action, with English Translation, mailed on Jun. 2, 2010, for CN Patent Application No. 200780043545.9, 9 pages.

Chinese Office Action, with English Translation, mailed on Nov. 30, 2011, for CN Patent Application No. 200780043545.9, 10 pages.

Chinese Office Action, with English Translation, mailed on Mar. 1, 2012, for CN Patent Application No. 200780043545.9, 8 pages.

Definition of "Smart Card"; 2000; *Collin's Dictionary of Computing*; downloaded from the internet on Sep. 15, 2011; 1 page.

Definition of "Smart Card"; 2001; *Hargrave's Communications Dictionary*; downloaded from the internet on Sep. 15, 2011; 1 page.

Definition of "Smart Card"; 2003; *Webster's New World Computer Dictionary*; downloaded from the internet on Sep. 15, 2011; 1 page.

Definition of "Smart Card"; Date Unknown; Netlingo.com; downloaded from the internet on Sep. 15, 2011; 1 page.

Definition of "Smart Card"; *Dictionary of Computing*; 2008; downloaded from the internet on Sep. 15, 2011; 1 page.

Extended European Search Report mailed Nov. 12, 2010, for EP Patent Application No. 07843170.7, 8 pages.

Extended European Search Report mailed on Apr. 25, 2012, for EP Patent Application No. 07854911.0, 8 pages.

International Preliminary Report on Patentability mailed Jun. 18, 2009 in Application No. PCT/US2007/086342, 7 pages.

International Search Report mailed on Jul. 21, 2008, for PCT Patent Application No. PCT/US2007/086342, 1 page.

International Search Report mailed on Jul. 31, 2008, for PCT Patent Application No. PCT/US2008/055195, 1 page.

International Search Report mailed on Aug. 1, 2008, for PCT/US2008/055196, 1 page.

International Search Report mailed on Aug. 4, 2008, for PCT Patent Application No. PCT/US2008/055192, 1 page.

International Search Report mailed on Aug. 15, 2008, for PCT Patent Application No. PCT/US2007/079453, 1 page.

International Search Report mailed on Jan. 9, 2009, for PCT/US2008/083181, 1 page.

International Search Report and Written Opinion mailed Jul. 6, 2010 in SG Application No. 200902024-9, 19 pages.

Schellhorn, Gerhard; "Verification of a Formal Security Model for Multiplicative Smart Cards"; *Proceedings of the European Symposium on Research in Computersecurity*; Oct. 4, 2000; pp. 17-36.

* cited by examiner

AUTHENTICATION OF A DATA CARD USING A TRANSIT VERIFICATION VALUE

CROSS-REFERENCE TO RELATED APPLICATIONS

This application is related to co-pending patent applications entitled "Fraud Prevention for Transit Fare Collection" by A. Hammad et al. filed Feb. 28, 2007 and "Verification of a Portable Consumer Device in an Offline Environment" by A. Hammad et al. filed Feb. 28, 2007 and "Bank Issued Contactless Payment Card Used in Transit Fare Collection" to A. Hammad et al. U.S. patent application Ser. No. 11/566,614 filed Dec. 4, 2006 and "Mobile Transit Fare Payment" to A. Hammad et al. U.S. patent application Ser. No. 11/536,296 filed Sep. 28, 2006. The contents of these related applications is incorporated herein by reference in their entirety for all purposes.

BACKGROUND OF THE INVENTION

The present invention is related to financial transactions conducted with portable consumer devices such as payment cards and smart cards.

Portable consumer devices can take many forms and are used in a great variety of financial transactions. The devices can comprise, for example, smart cards, payment tokens, credit cards, debit cards, contactless cards, and the like. The financial transactions can involve retail purchases, transit fare collection, access to venues, and the like. In all such transactions, the device users (consumers) are primarily concerned with convenience, ease of transacting business, and quickness of the transaction. Businesses and account acquirers and card issuers are concerned with preventing fraud, which ultimately increases costs to consumers.

Fraud prevention typically involves authentication that a card user is entitled to use the card and verification that the user account has sufficient funds for the desired transaction. Conventional payment card systems utilize an authorization process and user authentication requirements that involve online data communications over processing networks to check data with systems of the businesses, acquirers, and issuers. Such systems generally require that the user must pass the card through a card reader or other mechanism to permit the system to read data from the card and, in some cases, write data back to the card. Although such processing can be effective at preventing fraud, such procedures can increase the transaction time to certify a card for use and can make it difficult to provide an efficient and convenient user experience.

The problems encountered in such payment card systems has led to an interest in the use of contactless "smart" cards or contactless smart chips as part of a payment system. A smart card is generally defined as a pocket-sized card (or other portable payment device) that is embedded with either a microprocessor and one or more memory chips, or as one or more memory chips with non-programmable logic. The microprocessor type card typically can implement certain data processing functions, such as to add, delete, or otherwise manipulate information stored in a memory location on the card. In contrast, the memory chip type card (for example, a pre-paid phone card) can only act as a file to hold data that is manipulated by the reading device to perform a pre-defined operation, such as debiting a charge from a pre-established balance held in the memory or secure memory. Smart cards, unlike magnetic stripe cards (such as conventional credit cards), can implement a variety of functions and contain a variety of types of information on the card. Therefore, in some applications they do not require access to remote databases for the purpose of user authentication or record keeping at the time of a transaction. A smart chip is a semiconductor device that is capable of performing most, if not all, of the functions of a smart card, but may be embedded in another device.

Smart cards come in two general varieties; the contact type and the contactless type. A contact type smart card is one that includes contacts which enable access to the data and functional capabilities of the card, typically via some form of terminal or card reader. A contactless smart card is a smart card that incorporates a means of communicating with the card reader or terminal without the need for direct contact. Thus, such cards may effectively be "swiped" by passing them close to the card reader or terminal. Such contactless cards typically communicate with the card reader or terminal using RF (radio-frequency) technology, wherein proximity to an antenna causes data transfer between the card and the reader or terminal. Contactless cards have found uses in banking and other applications, as they may not require removal from one's wallet or pocket in order to complete a transaction. Further, because of the growing interest in such cards, standards have been developed that govern the operation and interfaces for contactless smart cards, such as the ISO 14443 standard. A variety of financial transactions, such as retail payment and transit fare collection, have adopted the ISO 14443 standard for contactless smart cards.

Some applications, however, are limited in their ability to accommodate conventional online authentication and verification schemes. For example, for transit fare collection and venue access, long lines of persons who wish to gain entrance mean that the speed of the transaction for the user is a primary consideration. This means that the transit fare payment and collection process can not be performed effectively using a conventional online authentication and approval process. This presents a difficulty because effective fraud prevention typically requires authentication that the card user is entitled to access and has sufficient funds for the desired transaction. In addition, different fare collection systems will typically have different authentication requirements, fare calculations, and ancillary data requirements. This means that a smart card, if desired to be used in a fare collection environment, must contain the data relevant for the system a user wishes to utilize. This can become a significant problem if a user wishes to utilize more than one system, such as multiple transit agencies or venues within a single geographical area or in different cities or locations.

Further, as transit typically involves moving between stations, with different fare calculations and rates required depending upon the actual travel distance, direction, patron category, and/or times of use, fares may need to be computed based on station entry and exit location, direction, mode of travel, category of patron, and possibly time of day. This would require that the smart card terminals/readers at each station or route be able to perform these computations based on data stored and retrieved from a user's card, and subsequent card terminals/readers be able to access data written to the card at previous stations. This places a significant processing burden on the terminals and/or fare processing systems and increases the cost of implementing the infrastructure for such systems. As fare rates and other relevant information generally change over time, this also increases the demands placed upon such systems.

A related issue is the need to protect confidential data on the payment cards. It is known to provide data for multiple accounts on a single card, thereby enabling users to carry a single payment card that permits payment through multiple accounts. In this way, part of the combination card can be utilized for a user's banking payment card, and another part of the card can be utilized for a particular vendor account or for an alternative service provider, such as a transit agency or for venue access. The combination card might include confidential data for authentication and other forms of identification data that are required for payment in a conventional point of sale transaction for the banking payment. Because of security concerns at the alternative agency or venue, it may be undesirable to permit the alternative payment process to have access to the banking data. This can create a problem if a user wishes to link their alternative transaction activities to their standard banking payment account so that the alternative transaction payments can be completed, or if the user desires to use the banking payment account to "load" the balance for the alternative transaction account.

More specifically, transit fare collection, venue entrance fee payment, and the like must be conducted offline because of transaction speed requirements, such as at a transit fare device of a subway turnstile or bus farebox. In such circumstances, there is effectively insufficient time to go on-line to the issuer for transaction approval, and still have time to process a flow of thirty to forty-five passengers per minute, as required in the typical transit environment. Some form of off-line card authentication is required to stem potential counterfeit card attacks and potential for organized fraud. These and other issues that need to be resolved include:

Card authentication must be achieved (off line at the transit fare device) to halt use of counterfeit cards and potential for unbounded fraud. However there are no provisions for card authentication utilizing the existing MSD application.

Key management is problematic in many-to-many relationships (agency's and issuers). Fore instance, how do symmetric keys get exchanged ahead of time prior to creation of issuer/agency relationships?

Creation of appropriate file space and management of card memory is difficult to coordinate, especially in cases where the participants (issuers and agencies) do not have relationships in advance of card issuance.

Transit negative list management is an issue, because of the potential for negative lists to grow out of bounds as contactless issuance expands and/or when counterfeit card attacks occur.

One technique for a solution to the above problems requires that transit patrons pre-register their cards prior to first use to collect fares, at which time the keys and files may be added to the card. However, transit agencies have indicated they generally do not want everyone to have to register their cards prior to first use.

Another technique for a solution requires that transit agencies and issuers have an advanced agreement and relationship prior to the card being used in transit. Under this circumstance, it is possible that the issuer place the agency keys and files on the card prior to issuance. However, transit agencies have indicated they generally do not want to have to maintain relationships with each issuer. Transit agencies would like any transit-capable card to work in their systems without pre-notification or agreement.

There is a need for payment transaction processing in the use of payment systems that is capable of minimal transaction time processing and that ensures effective fraud prevention. The present invention satisfies this need.

SUMMARY

Transaction processing in accordance with the invention involves receiving data from an access transaction application of a portable consumer device, wherein the received data comprises data from an access transaction data string that includes a transit verification value wherein, with the exception of the transit verification value, the access transaction data string is substantially similar to a retail data string comprising retail data, wherein the access application data string is adapted for use with an access transaction processing system and the retail data string is adapted for use with a retail processing system. The transaction processing further includes processing the received data comprising the transit verification value. In this way, the invention provides payment systems that are capable of minimal transaction time processing and that ensure effective fraud prevention.

In a related aspect, a portable consumer device, such as a credit card or payment card, can include retail application data as well as access transaction application data. The retail application data is for use in connection with a retail transaction, the data having a predetermined data field configuration for use with a retail processing system of an issuer that receives the retail application data and processes it to either authorize or deny a retail transaction, the retail application data including a primary account number (PAN) associated with the portable consumer device. The access transaction application data is for use in connection with an access transaction, the data having a predetermined data field configuration for use with a reader of an agency, wherein the predetermined data field configuration of the access transaction application data is substantially similar to the retail application data field configuration, except that the access transaction application data includes selective authorization data, other than the PAN, that is associated with the portable consumer device and is used by the issuer to either authorize or deny the access transaction.

Other objects and advantages of the present invention will be apparent to one of ordinary skill in the art upon review of the detailed description of the present invention and the included figures.

DETAILED DESCRIPTION

Although the following discussion of embodiments constructed in accordance with the present invention is directed to providing access to a transit system, it should be understood that the invention has application to other types of environments as well. Specifically, the invention is useful for a transaction in which access to a venue or facility is desired.

In that regard, as used herein, an "access transaction", "venue access application", and similar terms are intended to include any transaction whereby a user uses a portable consumer device to access a particular facility such as a train, concert venue, airplane, transit station, workplace, toll road, and the like. Access is usually granted through an access device such as a gate or farebox at a train station. Although an "access transaction" could involve payment of some kind (e.g., deduction of a prepaid amount from a transit account), an "access transaction" is a different type of transaction than a "payment transaction", which includes a transaction that allows one to pay for a good or service at a point of sale. In a "payment transaction", a person does not use a portable consumer device to access a particular location, but is using the portable consumer device to pay for a good or service at a point of sale. Thus, in the description of the present invention, both "transit system" and "access transaction" are intended to represent a generic transaction in which access is desired to a particular building, system, facility, or venue.

In a conventional retail transaction processing system, an electronic payment transaction is authorized if the consumer conducting the transaction is properly authenticated and has sufficient funds or credit to conduct the transaction. Conversely, if there are insufficient funds or credit in the consumer's account, or if the consumer's portable consumer device is on a blacklist (e.g., it is indicated as possibly stolen), then an electronic payment transaction may not be authorized. In the following description, an "acquirer" is typically a business entity (e.g., a commercial bank) that has a business relationship with a particular merchant. An "issuer" is typically a business entity (e.g., a bank) which issues a portable consumer device such as a credit or debit card to a consumer. Some entities may perform both issuer and acquirer functions.

The portable consumer devices according to embodiments of the invention may be in any suitable form. For example, the portable consumer devices can be hand-held and compact so that they can fit into a consumer's wallet and/or pocket (e.g., pocket-sized). For example, the portable consumer devices may include smart cards, ordinary credit or debit cards (with a magnetic strip and without a microprocessor), a keychain device (such as the Speedpass™ device commercially available from Exxon-Mobil Corp.), and the like. Other examples of portable consumer devices that can be constructed in accordance with the invention include cellular phones, personal digital assistants (PDAs), pagers, payment cards, security cards, access cards, smart media, transponders, and the like.

For purposes of illustration, embodiments of the invention are described primarily in the context of contactless smart cards, but embodiments of the invention are not limited thereto. In embodiments of the invention for access to a transit system, the contactless smart card typically communicates with a transit system fare collection mechanism using a short range communication method, such as a near field communications (NFC) capability. Examples of such NFC technologies include ISO standard 14443, RFID, Bluetooth™ and Infra-red communications methods.

In conventional operation, an authorization request message is created during or after a consumer purchase of a good or service at a point of sale (POS) using a portable consumer device (such as a credit card or debit card or mobile device). In the present case, the portable consumer device may be a dual function smart card. The authorization request message can be sent from the POS terminal located at a merchant to the merchant's acquirer, to a payment processing system, and then to an issuer. An "authorization request message" can include a request for authorization to conduct an electronic payment transaction. It may include one or more of an account holder's payment account number, currency code, sale amount, merchant transaction stamp, acceptor city, acceptor state/country, and the like. An authorization request message may be protected using a secure encryption method (e.g., 128-bit SSL or equivalent) in order to prevent data from being compromised.

Figure 1:
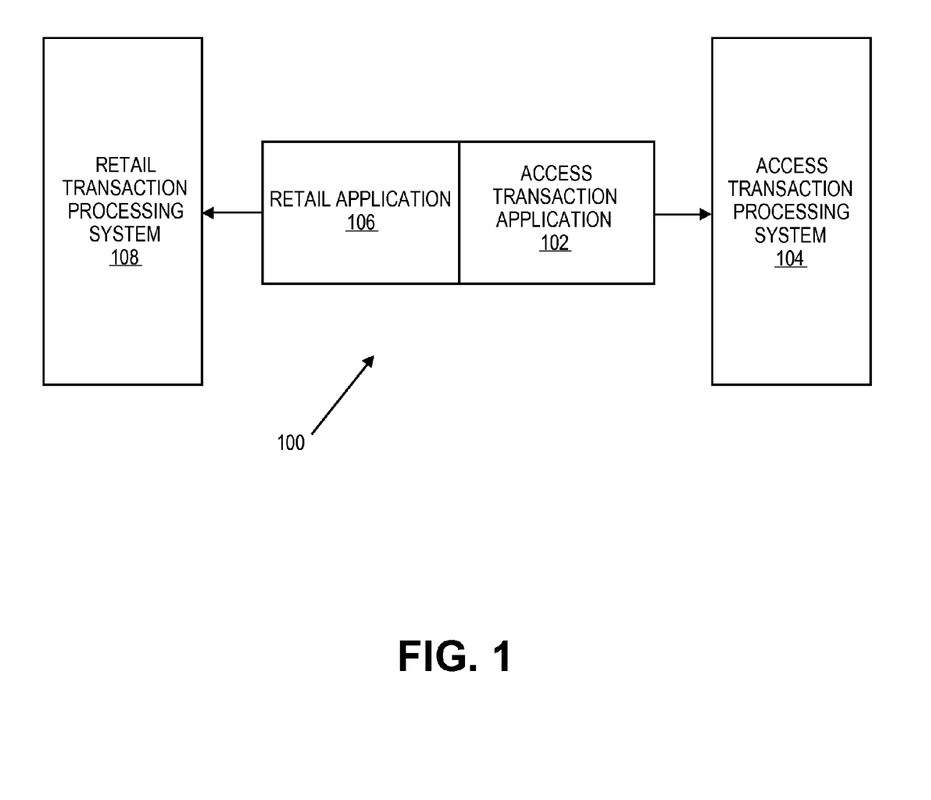
FIG. 1 is a representation of a portable consumer device constructed in accordance with the present invention.

FIG. 1 depicts a portable consumer device 100 constructed in accordance with the present invention for use in connection with an access transaction processing system. The device is configured for two payment applications, a first payment application and a second payment application. The first payment application of the card is for an access transaction 102 such as a transit application. The second payment application comprises a retail payment application 106. The portable consumer device may be embodied in a variety of configurations as noted above, including smart cards, credit or debit cards, keychain devices, wireless cellular telephones, personal digital assistants (PDAs), pagers, payment cards, security cards, access cards, smart media, transponders, and the like. In any of these configurations, the portable consumer device is provided in conjunction with an issuer (e.g. bank or financial institution) that provides issuer processing for access transactions with the device.

In connection with an access transaction such as a transit use, the portable consumer device 100 can be provided with data elements comprising verification value data (also referred to as "Transit Card Verification Value" (TCVV) in this discussion). Many options exist for placement of TCVV within data areas of the device 100, including but not limited to issuer discretionary data space, as well as data track positions currently holding Personal Identification Number (PIN) information. As an example, the TCVV data could replace the PIN data that would be recorded on the device 100 for a conventional retail payment format. The transit application 102 may also store transit data files so as to include blocking data that is read by the access transaction processing system 104 to halt processing for conducting the transaction if a problem, such as likely fraud, is detected. Thus, the portable consumer device 100 can be used in connection with transit services at a processing reader 104 at farebox collection points, turnstiles, venue entrance locations, and the like. Such collection point devices are the offline entry point for subsequent processing that involves agency, acquirer, and issuer processing systems, as described further below.

In the illustrated FIG. 1 embodiment, the retail payment application 106 is configured to store data in accordance with the retail payment MSD (magnetic stripe data) or MSI (magnetic stripe image) format of a retail payment system, such that the conventional user PIN data is included, including Track 1 and Track 2 data. The retail application 106 permits the device 100 to be used for retail transactions at a retail processing reader at point-of-sale (POS) locations 108 in the retail (online) environment. Thus, the device 100 supports dual-use that permits the user to have a single device with which to carry out conventional retail payment system transactions and also transit system transactions in accordance with the present invention.

The portable consumer device 100 in accordance with the invention uses a combination of components to solve the problems of conventional systems as described above. The retail payment application 106 works in a conventional manner, with no change to the mechanisms typically used for contactless payment processing at retail locations. As noted above, the transit environment will not process retail payments and collect fares in this manner. The access transaction application 102, however, can accommodate offline processing in the transit environment, in which the access transaction application 102 file configuration is as described below. The readers of the retail processing system 108 do not have access to the transit application 102, and the readers of the access transaction processing system 104 do not have access to the retail application 106. Those skilled in the art will understand how data may be configured at the device 100 to facilitate the separation of access privileges to the different applications 102, 106.

Thus, a portable consumer payment device 100, such as a contactless smart card, can include a verification data region configured to store data in accordance with a magnetic stripe data format that specifies data fields within Track 1 and Track 2 payment system definitions. Amongst other choices, this data could be included in the fields comprising Personal Information Number (PIN) data, such that the PIN data field contains verification value data in place of the PIN data. A contactless smart card portable consumer device may thus be used with processing reader equipment that is compatible with conventional magnetic stripe data (MSD) formats and recognizes data fields of the MSD formats, so that integration with conventional processing equipment is readily achieved. It should be understood that the processing reader will be configured to properly interface with the portable consumer device of the system implementation, whether the portable consumer device takes the form of a contactless smart card, keychain device, token device, wireless telephone, and the like as described above.

Because the verification value data is easily read from the device 100, it is suited to access transactions such as in the transit environment where quick, offline transaction processing is appreciated. In this way, the Card Verification Value of the conventional MSD format comprises a "transit Card Verification Value" (referred to herein as TCVV), though it should be understood that the TCVV can be used in a variety of environments, such as venue entrance and the like.

Card Data Hierarchy

Figure 2:
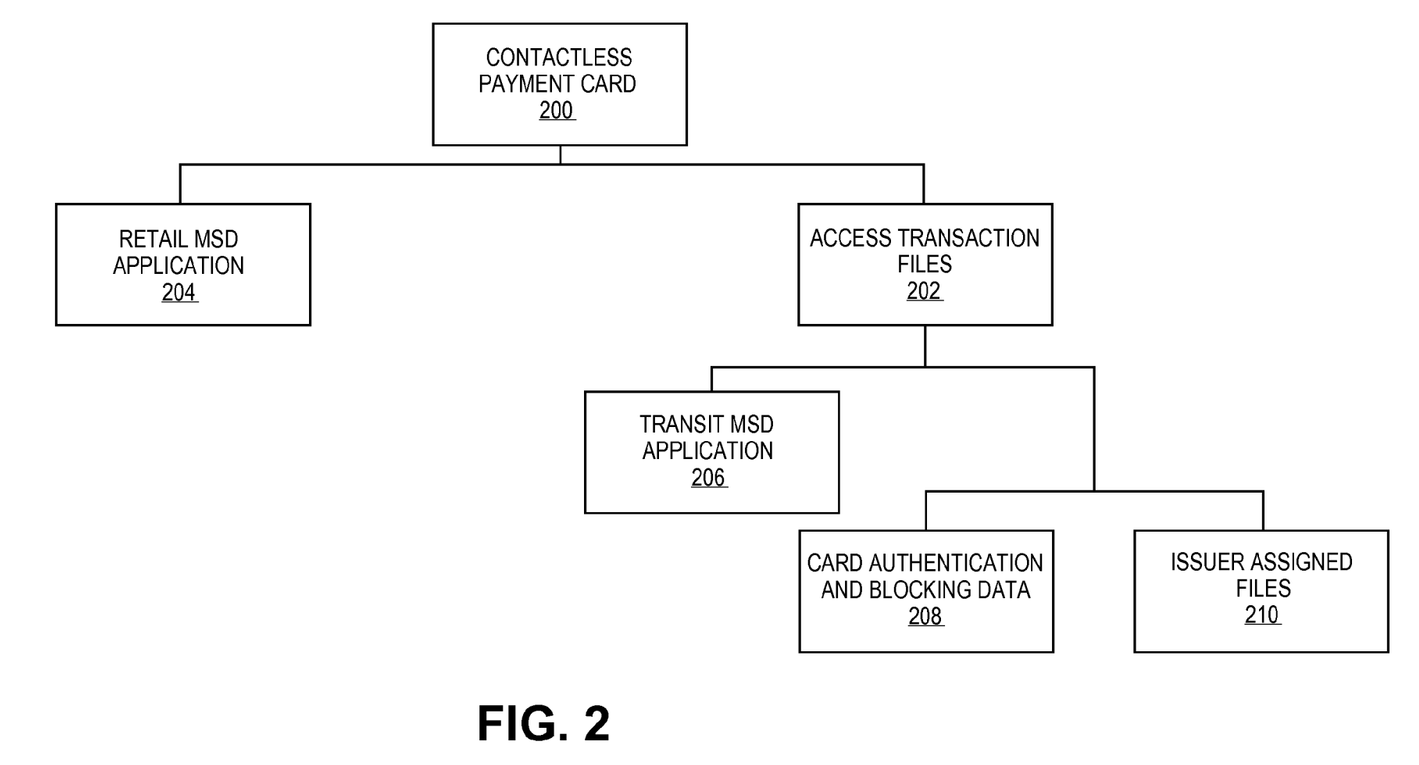
FIG. 2 is a hierarchical representation of the data stored on the portable consumer device illustrated in FIG. 1.

FIG. 2 depicts the hierarchical data configuration of a portable consumer device 100 (FIG. 1) constructed in accordance with the invention, embodied as a contactless smart card 200 configured with retail and access transaction information separately installed. In FIG. 2, the contactless smart card data configuration is represented at the top of the hierarchy 200, with access transaction files 202 on one side of the hierarchy and the retail MSD application 204 on the other side. The retail application files 204 of the contactless smart card 200 relate to the retail application 106 (FIG. 1). The access transaction files 202 of the data hierarchy can include transit MSD application information 206 related to the transit application 102 (FIG. 1), and also can include supplemental transit files including card authentication and blocking data 208 and issuer assigned files 210 described further below.

The magnetic stripe data (MSD) retail payment format is well-known to those skilled in the art. The retail MSD application files 204 and the transit MSD application files 206 of the contactless smart card 200 are configured according to the MSD retail payment format under the ISO 8583 standard for financial transaction cards that specifies the use of payment track data including Track 1 and Track 2 data elements.

The transit MSD application information 206 includes a transit-specific version of the contactless MSD application format. The transit MSD application provides the ability of the contactless card 200 to provide unique account information in the form of cardholder "Mag Stripe Data" as defined by specifications of the card issuer for contactless payment, using MSD specifications. The transit MSD application information 206 is provided separately from the conventional retail MSD contactless application information 204. The retail MSD application information 204 is not stored within, and cannot be accessed from, the transit MSD application side 206, and vice versa. Either or both of the MSD application instances 204, 206 may include one or more access conditions in order to ensure the separation between applications. That is, access codes and the like for the card 200 are configured such that a reader of the retail transaction processing system 108 (FIG. 1) cannot access the transit files 206, and a reader of the transit processing system 104 (FIG. 1) cannot access the retail files 204.

The transit MSD application information 206 provides issuers with the ability to limit the use of the card 200 for transit purposes only, providing selective authorization of the transit application. Selective authorization can advantageously limit the use of the card in accordance with processing that is keyed to the access transaction portion 102 of the card 100 (FIG. 1). This can be especially important, for example, in the transit or access environment, where cardholder data is often stored in fare collection boxes of transport vehicles or in entrance pavilions or turnstile booths that are not especially secure. Issuers and cardholders can be understandably concerned about the security of account numbers and the like. In the embodiment illustrated in FIG. 2, the Transit MSD application 206 is associated with a Primary Account Number (PAN). The transaction processing system 104 reads the transit PAN and provides the selective authorization processing.

More particularly, selective authorization is provided by means of storing the cardholder data read from the card 200, associated with the transit PAN, in the fare collection devices (such as transport fare collection boxes, entrance pavilions, turnstile booths, and the like) and permitting the card issuer to configure the card data so that use of the PAN data can be limited to specific acceptance locations, or specific applications. In this way, the issuer can implement selective authorization of the transit application and associated data. If the card 200 is presented for a use other than what is authorized by the transit PAN data, the use of the card will be denied. For example, the transit PAN data can be associated with the Merchant Category Code (MCC) of cards such as described under the ISO 8583 standard. If cardholder data stored in collection devices is compromised, the data will be associated with only a limited group of MCC data, such as transportation agencies and the like. Any attempted use of the compromised cardholder transit PAN data will be refused for purchases outside of the authorized application. In this way, filters can be applied by the payment processing systems for cards according to the industry-standard MCC data for use with transaction cards. Thus, the transit MSD Application information 206 can be used to filter out attempted uses of the card outside of authorized purposes, such as purposes outside of the transit category. In this way, the transit PAN data will only be useful for access transactions, and risk of loss from compromised cardholder transit application data is minimized.

Processing System

Figure 3:
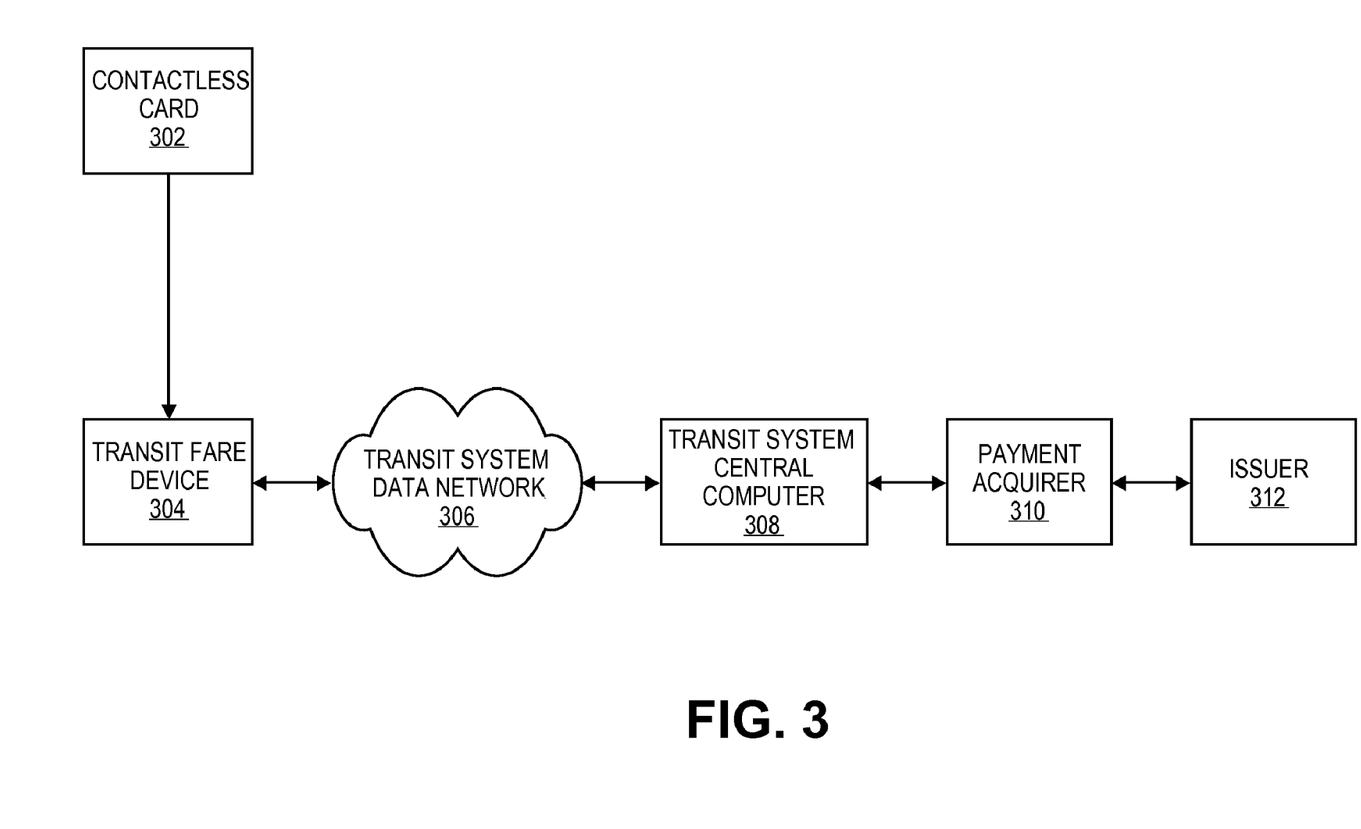
FIG. 3 is a depiction of the processing system in which the portable consumer device of FIG. 1 is used.

FIG. 3 is a depiction of the processing system in which the portable consumer device 100 of FIG. 1 is used. In this description, the portable consumer device will be described in terms of a contactless smart card that includes transit MSD application data. When the contactless smart card 302 is presented for use, it is read by a contactless processing reader 304 at a fare collection or venue entrance point. At the processing reader, the transit MSD application provides payment track data including cardholder transit account (transit PAN) information, expiration date, service codes, and the like. The contactless processing reader or transit fare device 304 will also have any encryption keys and associated algorithms for processing authentication data on the card, and thus may authenticate the card at the time of the transaction. If the transit PAN and expiry date information are validated at the fare device 304, along with any other data being used to verify the card 302 at the point of sale (POS), then the cardholder is passed through the collection device or is otherwise allowed entry.

The fare collection device 304 then forwards the transit PAN information over the transit system data network 306 to the transit central computer 308 along with the time, date, and location of the transaction. The transit central computer 308 performs a fare calculation based on the information from the fare device 304 and the history of transactions for the contactless card (which is uniquely identified by the transit PAN), along with the fare policy as defined by the transit agency. The card information is typically passed to the agency computer system 308 some time after the fare transaction POS occurs. The time before the data is passed can be a matter of seconds or minutes, or a longer time. For example, in the case of a transport bus, the fare collection data might not be forwarded to the transport agency central computer 308 until the bus returns to a garage facility at the end of a run or at the end of the day.

At the agency central computer 308, payment processing is performed as defined by the agency. For example, the agency may implement payment models with a variety of schemes, such as pay-as-you-go, one transaction at a time; aggregation of many transactions into an aggregated amount based on time or value; and pre-pay accounting, where a proxy account is created and is reduced by each transaction amount until a top-up of the proxy account is required based on time or value. After the fare calculation POS transaction processing is complete, the transit agency computer 308 processes the payment total through the agency payment acquirer 310. The transaction may thereafter be approved or declined by the card issuer 312. For example, the issuer might identify the cardholder data as including a transit PAN that is not authorized for the transaction being processed, by comparing the transit PAN against the MCC data. In that situation, the issuer 312 would likely decline the transaction.

Card Processing

Figure 4:
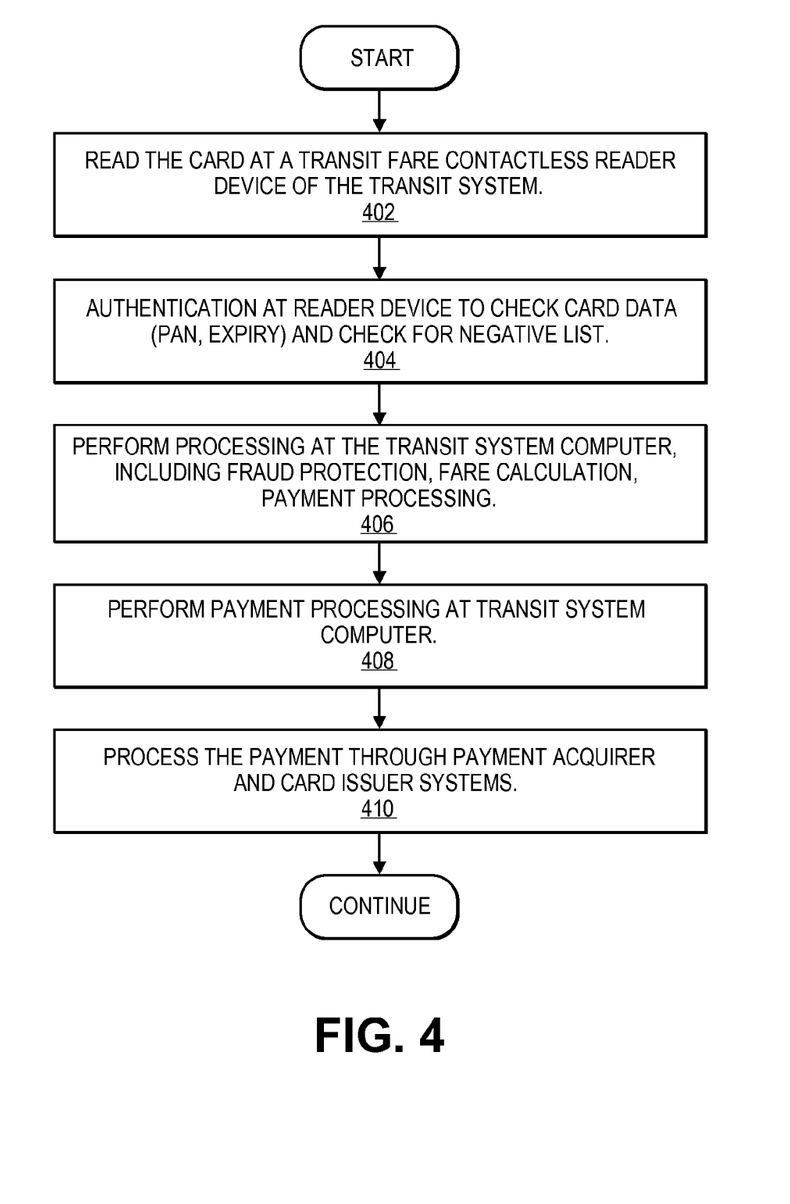
FIG. 4 is a flowchart that illustrates the operations performed by the transaction processing system of FIG. 3 for the portable consumer device illustrated in FIG. 1.

FIG. 4 is a flowchart that illustrates the processing operations for transit fare collection with the contactless card 100 that further describes the operations illustrated in FIG. 3. The initial operation, indicated by the first flowchart box 402, occurs when the card is read by a contactless processing reader at the transit fare collection device. The transit MSD application information of the contactless card provides payment track data including transit PAN, expiry date, service code, and the like.

At box 404, the TCVV, transit PAN, and expiry date are validated at the fare device and the transit PAN is examined for inclusion on a negative list (discussed further below). If the transit PAN is not found on the negative list, then the card is considered authenticated, and the transit PAN is forwarded to the transit central computer along with the time, date, and location of the transaction. If the card is considered authenticated, the transit patron is allowed to enter the transit system without further fare processing. Additional fare processing is required as described below, but the patron movement through the transit payment area is not encumbered by the additional processing.

At box 406, the transit central computer performs a fare calculation based on the history of transactions for the card (uniquely identified by transit PAN) along with the fare policy as defined by the transit agency. Thus, a user's account balance and the current fare charges can be reconciled at box 406. At box 408, payment processing is performed as defined by the transit agency or venue. A variety of payment models can be accommodated and can include the following payment examples: pay-as-you-go, one transaction at a time; aggregation of many transactions into a lump amount based on time or value; and pre-pay accounting where a proxy account is created and reduced until a top-up of the proxy account is required based on time or value. Lastly, at box 410, once the payment processing is complete at the transit central computer, the transit agency processes the payment total through their acquirer for approval or decline by the issuer using the data stored in the transit side of the card.

Figure 5:
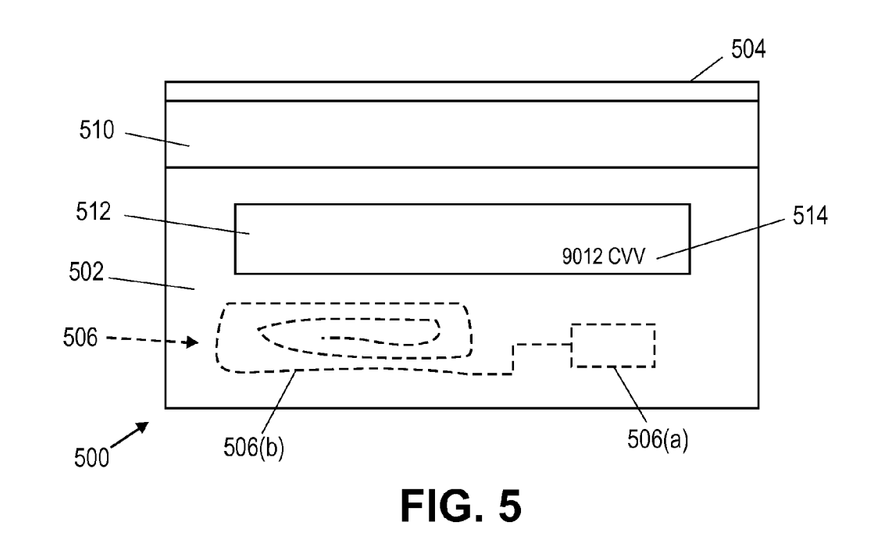
FIG. 5 is an illustration of a portable consumer device of FIG. 1 comprising a contactless smart card constructed in accordance with the present invention.

FIG. 5 shows an embodiment in which the portable consumer device comprises a contactless payment smart card 500 for use in a transit system. FIG. 5 shows the reverse face 502 of the smart card 500. The smart card includes a base 504, which may be a plastic substrate. In other portable consumer devices, the base may comprise a structure such as a housing or internal circuit board, if the portable consumer device is a wireless phone or personal digital assistant. The card 500 includes a computer readable component 506 comprising an interface for communication with the offline reader of the associated transit processing system. The computer readable component 506 can include a processor chip 506(*a*), having logic circuitry with memory, and an antenna element 506(*b*). The antenna element is generally provided in the form of a coil and may be embedded within the base 504. The antenna element 506(*b*) may be powered by an internal or external source to allow for the contactless transmission of data to a card reader. The processor chip memory 506(*a*) stores the supplemental verification value described herein and can also be used to store Track 1 and Track 2 data, and the issuer verification value associated with conventional payment systems. The memory also can store issuer assigned data files, as described further below. In FIG. 5, the processor chip 506(*a*) and antenna element 506(*b*) are both embedded within the base 504 and therefore are illustrated in dotted line.

If desired, the reverse face 502 of the card 500 can include magnetic media or material 510 to store data for processing with a contact-type (online) reader of a payment system. Beneath the optional magnetic media 510 on the reverse face 502 is a signature block 512 on which the cardholder signature is written, and printed on the signature block is a four-digit card number value (shown as "9012" in FIG. 5) and another three-digit CVV value 514 for typical online financial transaction processing.

Figure 6:
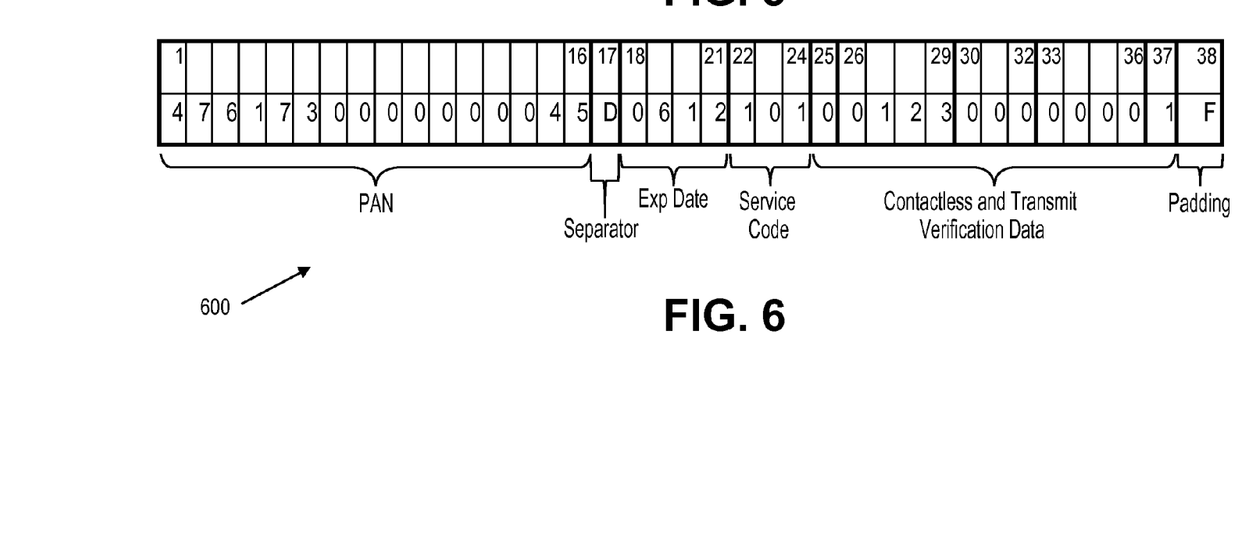
FIG. 6 is a diagram of the data record arrangement of the Transit MSD information on the portable consumer device illustrated in FIG. 1.

FIG. 6 shows a data string 600 associated with transit MSD application information that can be stored in the card. The data string comprises an access transaction data string used by the processing system 104 to process fares and the like. That is, the transit MSD information enables the card processing at the fare device or entry gate that performs validation and authentication (i.e., the processing of box 404 of FIG. 4). Those skilled in the art will appreciate that a conventional retail card includes a retail data string that has a somewhat similar arrangement of data fields as the access data string 600, according to a retail MSD data record format that includes what is referred to as "Track 2" data. The conventional Track 2 retail MSD data configuration comprises a 38-position data configuration. For the transit application, the data string 600 includes positions 1-16 that contain the user's transit PAN information, a position 17 that is a data field separator, positions 18-21 that contain expiration date of the card, positions 22-24 that contain a service code, and positions 25-37 that contain data that is specific to the processing of contactless transactions. For example, positions 25-29 can be allocated to a personal identification number or other verification data.

Data Format

In the transit MSD information 206 (FIG. 2), data record positions may include the transit Card Verification Value (TCVV) as noted above. The TCVV can be static, being stored on the card upon issuance or manufacture and not being changed thereafter, or the TCVV can be implemented as a dynamic field, similar to the functionality of the well-known dCVV field of conventional retail transaction cards. When implemented as a dynamic field, the TCVV value can be changed by the processor 506(*a*) of the portable consumer device. The other data fields of the transit MSD information contain data that is analogous to or substantially similar to that of corresponding fields in the MSD of a retail card. The corresponding retail data can be termed "retail MSD" or the retail data string. Both the transit MSD TCVV and the retail MSD may be stored on a computer readable component of the portable consumer device, such as the memory of the processor 506(*a*) illustrated in FIG. 5.

Also, although a TCVV with a specific number of indicia is shown in FIG. 6, verification values according to embodiments of the invention may have any suitable number or type of indicia. The TCVV verification value may have three, four, five, or more indicia in embodiments of the invention. It should also be understood that these positions shown in the FIG. 6 Track 2 data are for purposes of example, and that the actual positions of the TCVV could alternatively be stored in Track 1. Various Track 1 data fields may be used for this purpose, including issuer discretionary data fields, name fields, or others.

In the illustrated embodiment, the TCVV data includes a full or partial cryptogram that could be based on a system-wide key, or unique card values and encryption keys. The use of encryption algorithms and keys may include symmetric (i.e. triple DES) or public key infrastructure (i.e. RSA). The issuer of the card places this data into the track data of the transit MSD application at the time of card personalization. In the case of public key infrastructure, additional data elements may be necessary and may be stored outside the track data and read by the transit contactless reader along with the track data during the transit fare transaction. The contactless reader or transit fare device will have the encryption keys and algorithm for the TCVV data, and may then authenticate the TCVV value at the time of the transaction. The authentication can take place in the short time interval necessary for processing in the transit and venue access environment, as described above.

As noted above, the TCVV data provides a card authentication mechanism by the fare device that does not exist in conventional MSD transactions based on conventional retail MSD processing. The TCVV data of the contactless card 100 is provided for its ability to indicate cards that are likely counterfeit by virtue of not having the proper or expected TCVV value.

Issuer Assigned Data Files

Another means of providing protection against card theft and fraud provided by the portable consumer device 100 involves the use of the data files 208, 210 stored in the access transaction files 202 (FIG. 2). Such additional means involve mechanisms that can be implemented by the access transaction agencies, such as transit agencies, to deny future use of the portable consumer device 100. For example, at transit locations for fare collection, the contactless processing reader that is used in connection with the card 200 will be configured to not read cardholder data from the retail side 204, but will be able to perform two functions in connection with data for the access transaction 202. The first transit function is to read data for the transit MSD application 206, and the second function is to communicate with the supplemental file structure of the access transaction files 202. The access transaction file structure may include the card authentication and blocking data 208 and issuer assigned files 210. The configuration of the issuer assigned files relates to the size (data capacity) and location of the files within the device 100, and any keys that might be necessary to gain access to the data contained therein. The file format of data contained within the files 210 is generally specified by the agency or other entity to whom a particular file is assigned. The keys typically comprise encryption keys provided to the assigned agencies for gaining access to the files.

Negative List Processing

Once a device 100, such as a contactless smart card, is read at an access transaction terminal 104, such as a transit fare device, the transaction data is sent to the transit central computer where it is processed for fare calculation and payment. In addition to the TCVV processing describe above, the transit agency may use a negative list to deny future use of the card. Such processing is illustrated, for example, in box 404 of FIG. 4 and is described further below.

Conventionally, transit agencies sometimes maintain their own negative list of invalid account numbers. Transit cards issued by the issuer that are presented at fare collection devices are checked against the transit agency negative list. A list of invalid PANs can be searched during the transaction at the transit fare device, and if the card PAN is found on the list, the transaction would be denied. Negative lists in access transactions such as the transit environment can typically range from 100,000 to 2 million numbers. Transit fare devices have a limited amount of memory for storing such information and have a limited amount of time in which to search such information. The portable consumer device constructed in accordance with the present invention provides more efficient negative list processing.

The negative list processing in accordance with the invention is used to deny future use of a card based on unique non-retail identifying information of the card, such as a transit agency account number or transit PAN. During access transaction processing, an agency may identify a card as invalid either because of account information or from presence on a negative list. In either case, the issuer will deny payment on the transaction or will otherwise indicate that access is denied. If an issuer declines the access transaction payment, the submitting agency will know to deny use of that card on the next transaction by adding the card to the agency negative list. The transit agency itself can then be aware to deny use of the card.

Blocking Data

In accordance with the invention, the transit agency can also write blocking data stored in the transit application files 208 (FIG. 2) of the card or other portable consumer device to indicate a denied card. Such data can be used for efficient control and halting of transaction processing for particular portable consumer devices that are unauthorized or otherwise not authenticated. The blocking data may be read from the card at the processing reader 104 (i.e., transit fare collection device or venue access point) to indicate that the card had been previously identified as being on the negative list and is being blocked for any subsequent use. That is, if a card is identified as being on the negative list, it is likely a counterfeit card or possibly a lost or stolen card, or a card associated with a delinquent account or suspect account. In any of these situations, further processing will be halted. This may be accomplished by setting of the blocking data to a "blocked" status. The transit agency will not perform processing subsequent to the fare device and will not proceed to fare calculation and processing involving the acquirer and issuer if the blocking data on the card has a blocked status. That is, processing will not extend beyond the fare device at which the attempted card use occurs and the card holder will be denied entry. If the card is not already blocked and not identified as being on the negative list, then the card user is granted entry and further processing is subsequently carried out.

As used herein, "blocking data" includes any suitable data that can be stored on a portable consumer device and that can prevent authorization of a transaction and/or access to a venue or transportation system. Thus, for a given transaction processing system with which the portable consumer device will be used, the processing readers of the system will be configured to read the blocking data from the portable consumer devices. The blocking data may take any suitable form. For example, the blocking data may be embodied by a predetermined data string having one or more characters or bit values. In preferred embodiments, the blocking data is in the form of a single byte of data. For example, the blocking data can be set to a zero value to indicate "unblocked" status, and if the card is found to be on a negative list, the blocking data can be set to a non-zero value to indicate "blocked" status.

The blocking data on a portable consumer device can be changed by a processing reader or the like. A "processing reader" as used herein may include any suitable device that can interface with a portable consumer device and that may read and/or write data thereto. If the blocking data is in the form of a single byte of data, then the memory storage requirements on the portable consumer device will be minimized. The blocking data file configuration is specified by the issuer and requires encryption authentication to read or write data. In this way, the blocking data helps authenticate cards, because cards without proper encryption keys will immediately be identified as counterfeit or fraudulent. In addition, using the blocking data also significantly and advantageously allows the size of any blacklist or negative list to be minimized from what would be required if the blocking data were not present on the portable consumer device, because a card identifier number (such as the transit PAN) can be removed from the negative list once the identifier number is blocked (i.e., once the blocking data on the card is set to "blocked" status). When the blocking data on a card is set to blocked status, then every access transaction reader at which the card is presented will read the encrypted blocking data and will determine that the card is blocked and its use should be denied. This determination can be made without further processing such as examination of the negative list. In this way, the size of the negative list is more efficiently managed, the blocked card status is communicated across participating agencies without network data traffic, and quick processing speed at the collection reader is maintained, all the while ensuring that detecting blocked cards is achieved.

The negative list is managed in accordance with the present invention to provide an efficient means of fraud detection. Ordinarily, the mechanism for a transit agency to know if a card is invalid for payment involves receipt of a declined payment transaction from the issuer. If an issuer declines the payment transaction for a transit ride, which indicates that the card is not valid, then the transit agency central computer 308 (FIG. 3) would know to deny use of that card on the next transaction by adding the card to the negative list. After a card is added to the negative list, the fare collection devices will eventually communicate with the agency central computer and become aware of the updated negative list (see box 404 of FIG. 4 and accompanying text above). As payment card issuance grows, the propensity for the negative list to expand will also increase. Lost or stolen credit cards should be declined and would necessarily be added to a transit agency negative list if used in transit. Any card that is reissued using a different PAN would also require the original PAN to be discontinued. And counterfeit cards would likely be declined by the issuer and placed on the negative list. In all these circumstances, the negative list could be quickly checked at the transit fare device or venue access point and it could be quickly determined whether to halt the transaction processing or let it proceed.

A card 100 is generally removed from the negative list at the time of card expiration to ensure it is never used in the transit agency again, thereby limiting exposure of the agency to nonpayment. Other transit agency processing could control the size of the negative list by removing or adding entries based on predefined rules designed to effectively manage the limited negative list file space. The blocking bit processing described above provides one means of managing the size of the negative list and reducing the data storage requirement for such card status information. Those skilled in the art will be familiar with additional techniques for control of negative list size in connection with retail cards. These techniques can be applied in connection with the transit contactless card described herein and include the following examples.

Once the transit PAN is on the negative list, it can be removed if there are no further transactions using that card number for a predetermined time, such as for a number of days, but the card transit PAN will be added back to the negative list if another transaction is declined on the same PAN information. In another example, a previously declined transaction that is presented again to the issuer may be checked to see if the account is still invalid, and if the card is authorized on re-presentment, then the card can be removed from the negative list.

The combination of the transit MSD application and the card authentication and blocking data as described above provides all agencies the ability to process any so-enabled contactless card in a standardized fashion. This process would be required of all fare payment cards to be used in transit, for uniformity of processing, and would be made available to all issuers and agencies to be able to process any casual user or card that comes into contact with the transit system. These processes would be considered mandatory for all contactless payment cards containing transit capability. This approach solves many of the original issues described above, and provides a variety of benefits:

The potential for counterfeiting cards is removed due to the inclusion of card authentication capability (TCVV and/or the card authentication data within the transit file)
  No need for pre registration of card at each transit location. Allows the casual user or out-of-town visitor to process transactions at any time using Transit MSD.
  Common key sets for TCVV and file authentication will be used and distributed to all issuers for personalization of the card and to all agencies for TCVV validation and/or file authentication.
  No need for issuer/agency pre-agreement. Standardized MSD and authentication and blocking access is established for all issuers and agencies.
  Issuer brands (such as Visa USA) can establish rules for setting of the card blocking data. Setting of the "block" data in one agency may be usable in another agency without passing negative list data. The negative list process in one agency serves to protect all participating agencies. Removal of the blocking data could be done through a customer service process requiring agency agreement on best practices or through predefined rules.

The transit transaction is protected through layered transaction authentication:

1) At the fare device—counterfeit cards can be stopped with TCVV and/or file authentication.
2) At the transit agency—fraud validation rules and negative listing.
3) At the issuer—validate with TCVV, dCVV, and ATC.

In addition to the security schemes described above, access transaction agencies may implement a more detailed fare collection capability using an optional file capability of the card, in conjunction with the card issuer. The file capability permits the payment card described herein to go beyond the processing defined above. For example, a card with these optional file storage features may be used for persons who wish to register their cards for additional benefits. Predefined file space on the card may be allocated and assigned to specific agencies as desired by the issuer, based on relationships the issuer may form with the transit agencies. These issuer-assigned file spaces on the card could be used by the transit agencies for their own purposes, such as:

Include a non-PAN transit ID on the card to minimize use of the retail card PAN in the transit systems;
Include fare products on the card if desired;
Include patron category on the card if desired;
Include transaction history on the card to use in a next transaction sequence, or to forward to the agency central computer to fill transaction gaps;
Include other use-specific information as determined by the transit agency.

Figure 7:
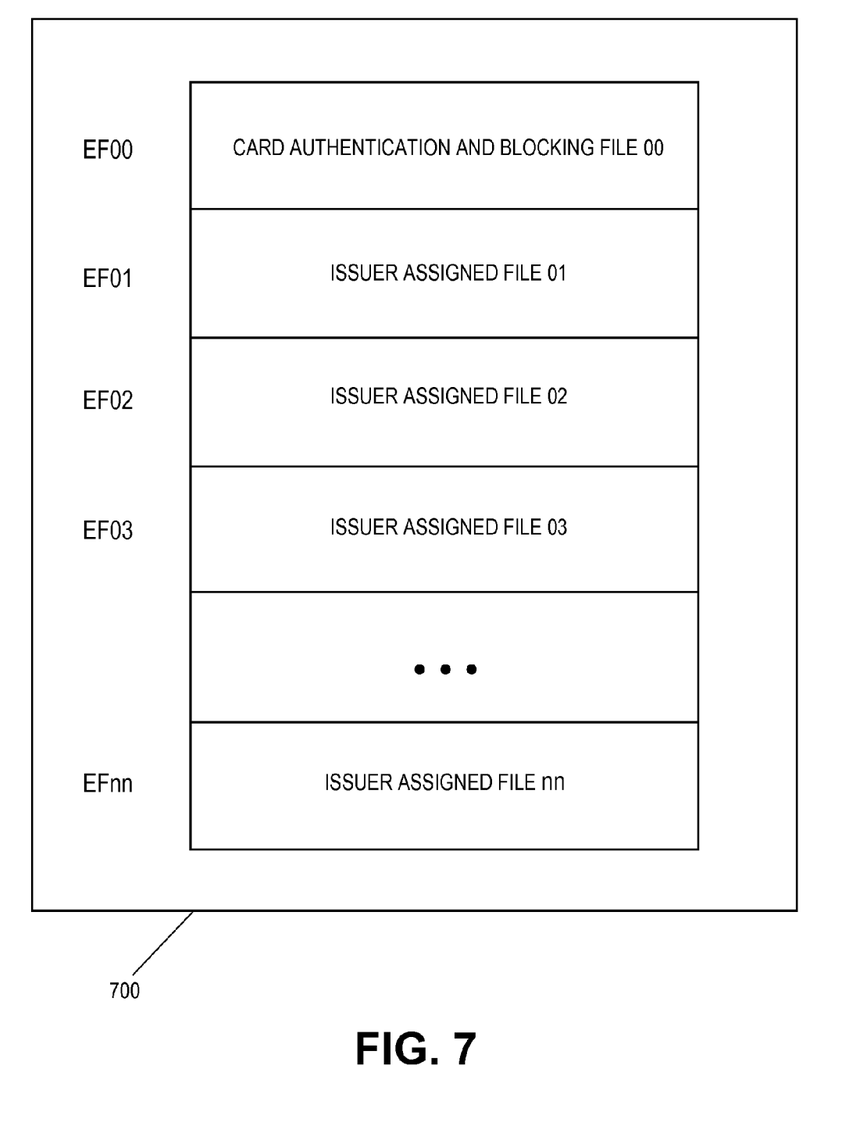
FIG. 7 is a diagram of a data file structure of the Transit Application files on the portable consumer device illustrated in FIG. 1.

An example of the issuer-assigned file configuration is illustrated by the hierarchical data file structure of FIG. 7 that is stored on the card 100 (FIG. 1). As noted above in connection with FIG. 2, the access transaction transit files include the transit MSD application and supplemental data files comprising the card authentication and blocking data 208, and the optional issuer assigned files 210. FIG. 7 shows that the card data file structure 700 includes a card authentication and blocking data file 00, represented by the first file EF00, and includes one or more issuer assigned data files 01, 02, 03, . . . , nn, represented by the files EF01, EF02, EF03, . . . , EFnn. The issuer assigned files will be of predetermined size and type. For example, an issuer may specify fifteen assigned data files EF01 through EF15 of 100 bytes, each based on a transparent file structure using ISO 7816 APDU commands for access. The issuer may assign authentication keys to each file. Once the issuer strikes a relationship with an agency, either before or after card personalization and issuance, the data file(s) may be assigned by the issuer and the authentication keys may be provided to the agency for access at that time. It is anticipated that the transit agency can define the use of the 100-byte data file as desired for their own purposes. That is, access to the issuer-assigned files is under control of the issuer, and agencies that reach agreement with the issuer can obtain access to the file space by receiving authentication keys from the issuer.

Many options are possible with respect to file construction and initialization of file data on the card. For example, the transit agency may predefine these with the issuer ahead of card issuance. Under this circumstance, the cardholder may receive the card in the mail pre-loaded, and be able to use the card in the transit system without further action. However, it is more likely that the cardholder would be required to perform a one-time card pre-registration process to load the file data for use in the transit system. This process will be established by the transit agency, and may include an in-person visit with customer service or may be established as a process at an unmanned kiosk or ticket vending machine in the transit system.

The issuer-assigned data files instantiated on the portable consumer devices such as contactless cards may, in effect, comprise a commodity having market value. For example, an issuer might charge the transit agency for use of the file space on the card based on many possible payment models, such as per-card, per-transaction, or one-time fees for the file space. In this way, the contactless card as described herein makes it possible for issuers to create business cases and exploit such market values.

Thus, the transit MSD application on the card as described herein provides convenience and security features that enable offline transactions with a minimum of processing time at the point of fare collection or venue entry. Among these features are that the transit side of the card can be limited in use for particular transit systems or venues for access and cannot be used for retail purchases. Because of the data file configuration on both areas of the card, the card supports dual use, for retail and transit, in accordance with conventional industry dual use card program guidelines. In addition, the card data on the transit area includes TCVV data to allow transit fare devices to authenticate that the card is not counterfeit. In providing such information, the card data includes Primary Account Number (PAN) and expiry date information for validation at the transit fare collection device. Another feature of the card is its ability to support negative listing at a transit fare collection device based on the PAN data, using agency-developed negative list management techniques.

The contactless card processing reader equipment is preferably configured to prevent reading of information from the retail side of the card. On the retail side of the card, typical transaction processing can be carried out, including retail payment features such as dynamic card verification value for conventional MSD retail transactions. Such retail processing is typically performed online, so that communication with the transaction processing reader and its associated transaction system network is needed for authentication. As noted above, the verification value data described herein permits offline verification, as required in the transit environment.

As noted, the portable consumer device can be configured as a dual use card having two application areas, an access transaction application 202 (e.g., transit) and at least one additional application area 204 (e.g., retail). Multiple additional application areas can be provided, if desired. For a multiple-use card, each additional application area of the card can be configured to have corresponding separate file hierarchy including data strings, verification value, issuer-assigned data files, and the like, in a parallel data hierarchy 202 such as illustrated in FIG. 2. In that situation, processing readers of one system will have access to only their corresponding application areas of the card and will not have access to any data of the other application areas of the card.

The portable consumer device described herein as a contactless smart card is conveniently used, because when a user in possession of the contactless smart card described herein passes within communications distance of a terminal associated with a transit system or venue, the contactless smart card can communicate with the fare collection system via a near-field communications capability. In this way the smart card can be used to identify the user, exchange authentication data (e.g., encryption keys or other forms of authentication/identification), provide data required for a fare computation, or provide other account related data to the collection system. Furthermore, this data may be provided to the transit agency and/or transaction processing entity if needed for account management or other functions.

In accordance with the present invention there has been described a structure and architecture for a contactless smart card or portable consumer device that may be utilized in both retail transaction payment and transit fare payment (or other venue access) environments. The data on the card may be provisioned by the card manufacturer, the card issuer, or at a time following manufacture and issuance. The card may include assigned file storage areas for storage of transit system data to permit the limited storage capacity of the card to be efficiently used to provide access to multiple transit systems.

As mentioned, in addition to the transit system application described, the inventive contactless smart card may also be configured with data that permits access to a variety of venues; these include, for example, amusement parks, theaters, toll stations, or other locations requiring specific access control and payment data in accordance with time constraints for processing. Payment for the transit fare or other access fee may be accomplished by linking the payment application account to the transit or other use. This linking may be performed using a proxy for the authentication and/or account data to ensure security for the payment application data.

It should be understood that certain elements of the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

While certain exemplary embodiments have been described in detail and shown in the accompanying drawings, it is to be understood that such embodiments are merely illustrative of and not intended to be restrictive of the broad invention, and that this invention is not to be limited to the specific arrangements and constructions shown and described, since various other modifications may occur to those with ordinary skill in the art.

As used herein, the use of "a", "an" or "the" is intended to mean "at least one", unless specifically indicated to the contrary.

We claim:

1. A portable consumer device comprising:
a processor chip; and
memory coupled to the processor chip, the memory storing:
retail application data for use in connection with a retail transaction, the retail application data having a retail application data field configuration for use with a retail processing system of an issuer that receives the retail application data and processes it to either authorize or deny payment for a retail transaction, the retail application data including a retail primary account number (PAN) that is associated with the retail application data and that identifies an account from which the payment is made, and the retail application data field configuration of the retail application data corresponds to a standardized format that includes selective authorization for merchant field categories that can be configured by the issuer to limit authorization of the retail transaction in accordance with the merchant field categories such that at least one predetermined merchant field category is accepted by the issuer for authorization of the retail transaction; and
access transaction application data for use in connection with an access transaction, the access transaction application data comprising a separate installation from the retail application data and having an access transaction application data field configuration for use with a reader of an agency from which the access transaction application data is received, wherein the access transaction application data field configuration of the access transaction application data is substantially similar to the retail application data field configuration, except that the access transaction application data includes an access transaction PAN that is used by the issuer to selectively authorize the access transaction and is used by the agency to grant access to a particular location at the reader, and the access transaction application data field configuration of the access transaction application data includes at least one data field that supports selective authorization for merchant field categories that can be configured by the issuer to limit authorization of the access transaction in accordance with the merchant field categories such that at least one predetermined merchant field category is not accepted by the agency for authorization of the access transaction;
wherein the access transaction application data further includes a transit verification value (TVV) that is adapted for offline verification processing in connection with the portable consumer device,
wherein the access transaction application data field configuration of the access transaction application data conforms to a magnetic stripe data (MSD) configuration,
wherein the TVV occupies a Personal Identification Number (PIN) data field of the MSD configuration, and
wherein the TVV is implemented as a dynamic value and is variable by the processor chip of the portable consumer device.

2. The portable consumer device of claim 1, wherein the access transaction PAN is associated with merchant category code (MCC) data of the MSD configuration.

3. The portable consumer device of claim 2, wherein the MCC data corresponds to a transit category, such that the issuer will deny any access transactions of the portable consumer device that are outside of a transit MCC.

4. The portable consumer device of claim 2, wherein the MSD configuration includes issuer assigned data files for data storage on the portable consumer device in the access transaction application data.

5. The portable consumer device of claim 1, further including issuer assigned data files for data storage in the access transaction application data of the portable consumer device.

6. The portable consumer device of claim 1, wherein the portable consumer device comprises a contactless smart card device.

7. A portable consumer device comprising:

a processor chip;

memory coupled to the processor chip, the memory storing:

retail application data stored the retail application data having a retail application data field configuration for use with a merchant reader of a retail processing system of an issuer such that the issuer receives the retail application data from the merchant reader and processes it to either authorize or deny payment on a retail transaction, and wherein the retail application data includes a retail primary account number (PAN) that identifies an account from which the payment is made, and the retail application data field configuration of the retail application data corresponds to a standardized format that includes selective authorization for merchant field categories that can be configured by the issuer to limit authorization of the retail transaction in accordance with the merchant field categories such that at least one predetermined merchant field category is accepted by the issuer for authorization of the retail transaction, and access transaction application data stored the access transaction application data comprising a separate installation from the retail application data and having an access transaction application predetermined data field configuration for use with an access reader of an agency, wherein the access transaction application data field configuration of the access transaction application data is substantially similar to the retail application data field configuration, except that the access transaction application data includes an access transaction PAN that is received by the agency from the access reader to selectively authorize access to a particular location at the access reader, and an antenna element coupled to the processor chip, the antenna element configured to perform contactless transmission of at least one of the retail application data or the access transaction application data to at least one of the merchant reader or the access reader;

wherein the access transaction PAN application data is received by the issuer to selectively authorize the access transaction;

wherein the access transaction application data further includes a transit verification value (TVV) that is adapted for offline verification processing in connection with the agency authorization of access to the particular location at the access reader;

wherein the access transaction application data field configuration of the access transaction application data conforms to a magnetic stripe data (MSD) configuration;

wherein the TVV occupies a Personal Identification Number (PIN) data field of the MSD configuration;

wherein the access transaction application data further includes blocking data that is received by the access reader to halt processing for conducting an access transaction when fraud is detected;

wherein the access transaction application predetermined data field configuration of the access transaction application data includes at least one data field that supports selective authorization for merchant field categories that can be configured by the issuer to limit authorization of the access transaction based on in accordance with the merchant field categories such that at least one predetermined merchant field category is not accepted by the agency for authorization of the access transaction, and wherein the TVV is implemented as a dynamic value and is variable by the processor chip of the portable consumer device.

8. The portable consumer device of claim 7, wherein the retail application data field configuration of the retail application data corresponds to ISO 8583 configuration data.

9. The portable consumer device of claim 7, wherein the access transaction PAN is associated with merchant category code (MCC) data of the MSD configuration.

10. The portable consumer device of claim 9, wherein the MCC data corresponds to a transit category, such that the issuer will deny any access transactions of the portable consumer device that are outside of a transit MCC.

11. The portable consumer device of claim 7, wherein the MSD data configuration includes issuer assigned data files for data storage on the portable consumer device in the access transaction application data.

12. The portable consumer device of claim 7, further including issuer assigned data files for data storage in the access transaction application data of the portable consumer device.

13. The portable consumer device of claim 7, wherein the portable consumer device comprises a contactless smart card device.

14. The portable consumer device of claim 1, wherein the retail application data cannot be accessed from the agency reader and the access transaction data cannot be accessed from the retail processing system such that the portable consumer device cannot link the corresponding accounts.

15. The portable consumer device of claim 7, wherein the retail application data cannot be accessed from the agency reader and the access transaction data cannot be accessed from the retail processing system such that the portable consumer device cannot link the corresponding accounts.

16. The portable consumer device of claim 7, wherein the retail application data includes a first access condition and the access transaction application data includes a second access condition different from the first access condition such that the merchant reader of the retail processing system cannot access the access transaction application data and the access reader of the agency cannot access the retail application data.

17. The portable consumer device of claim 7, wherein the access transaction PAN is examined for inclusion on a negative list, such that the access transaction is authorized when the access transaction PAN is not found on the negative list.

* * * * *